United States Patent [19]

Schlussler

[11] 4,050,069
[45] Sept. 20, 1977

[54] TRANSPONDER BASED LANDING SYSTEM

[75] Inventor: Henry Schlussler, Lincroft, N.J.

[73] Assignee: The United States of America as represented by the Secretary of the Army, Washington, D.C.

[21] Appl. No.: 719,790

[22] Filed: Sept. 2, 1976

[51] Int. Cl.² .............................................. G01S 9/56
[52] U.S. Cl. .............................. 343/6.5 R; 343/5 GC
[58] Field of Search ............ 343/5 GC, 6.5 LC, 6.5 R

[56] References Cited

U.S. PATENT DOCUMENTS

| | | | |
|---|---|---|---|
| 2,459,482 | 1/1949 | Bond | 343/5 GC X |
| 3,060,423 | 10/1962 | Goldan | 343/5 GC X |
| 3,136,991 | 6/1964 | De Faymoreau et al. | 343/6.5 LC |
| 3,230,527 | 1/1966 | Wehde et al. | 343/6.5 R X |
| 3,758,765 | 9/1973 | Vietor | 343/5 GC X |
| 3,999,007 | 12/1976 | Crane | 343/5 GC X |

*Primary Examiner*—Malcolm F. Hubler

*Attorney, Agent, or Firm*—Nathan Edelberg; Sheldon Kanars; Edward Goldberg

[57] ABSTRACT

An air traffic control system wherein a ground based interrogator/receiver interrogates an aircraft transponder which, in addition to responding to the interrogation, also transmits automatic encoded altitude information. The interrogator/receiver unit processes the received signal to derive relative azimuth and range information of the interrogated aircraft and to decode the altitude information to provide the aircraft reported altitude signal. The aircraft reported altitude signal is compared to the selected glide path height which is a function of the range that the approaching aircraft is from the runway touchdown point. The difference is noted on a glide scope meter. By observing the azimuth and range readings, and also the deflection from zero on the glide scope meter, the controller will be able to inform the aircraft pilot of the approaching aircraft position relative to runway center line, glide path and distance from touchdown.

10 Claims, 3 Drawing Figures

TRANSPONDER BASED LANDING SYSTEM

The invention described herein may be manufactured, used and licensed by or for the Government for governmental purposes without the payment to me of any roylaties thereon.

BACKGROUND OF THE INVENTION

This invention relates to a landing approach system and more particularly to a mobile based landing system.

In controlling air traffic at installations of relatively small areas, the controller operator must be able to identify, position fix, and vector cooperative or friendly aircraft. Although GCA systems perform such functions, such GCA systems are very expensive and are mainly restricted to relatively large operations because of their weight, size, and power consumption. Since mobile air control requirements may range from very small facilities, where only 1 or 2 aircraft may be involved, to facilities where larger numbers of aircraft have to be controlled simultaneously, such control landing systems must comprise equipment which is small in size, lightweight, consumes little power and is relatively cheap to manufacture and maintain. In developing such lightweight portable landing systems, it was found that L-band transponder systems normally available in commercial and military aircraft could be included as one component of the system. Such L-band transponder systems, in addition to providing an identification signal in response to the ground station interrogation, also provide automatic encoded altitude information to the ground or controlling station. The automatic altitude encoding is usually referred to as Mode C operation on the aircraft L-band transponder.

BRIEF SUMMARY OF THE INVENTION

It is an object of the present invention to provide a landing approach system which is mobile, light in weight, consumes little power, is small in size, and is inexpensive.

It is another object of the present invention to provide a landing approach system utilizing a ground based interrogator/receiver and a responding aircraft transponder.

In accordance with the present invention, the landing approach system operates in conjunction with aircraft having a transponder which includes means for automatically transmitting encoded altimeter information when the aircraft transponder is interrogated. Included in the system is a ground based interrogator/receiver unit for interrogating the aircraft transponder and adapted to receive response signals therefrom including the encoded altimeter information. The electronic center of the ground based interrogator receiver antenna is aligned with the center line of a prescribed landing runway. Included further are means for determining, respectively, the azimuth of the aircraft relative to the runway, and the range of the aircraft to the point of touchdown on the landing runway. Also included are means for decoding the aircraft altitude information to produce signals corresponding to the reported aircraft elevation, and means responsive to the output of the range determining means for generating signals corresponding to a vertical approach path for the aircraft such that the aircraft will proceed along a chosen glide path. Included further are means for comparing the vertical approach path signals with the reported aircraft elevation signals to produce error signals corresponding to the difference therebetween. The azimuth, range and elevation error signals comprise the information whereby a controller can inform the aircraft pilot his position relative to the runway and glide path, and distance from touchdown.

DETAILED DESCRIPTION OF THE INVENTION

Figure 1:
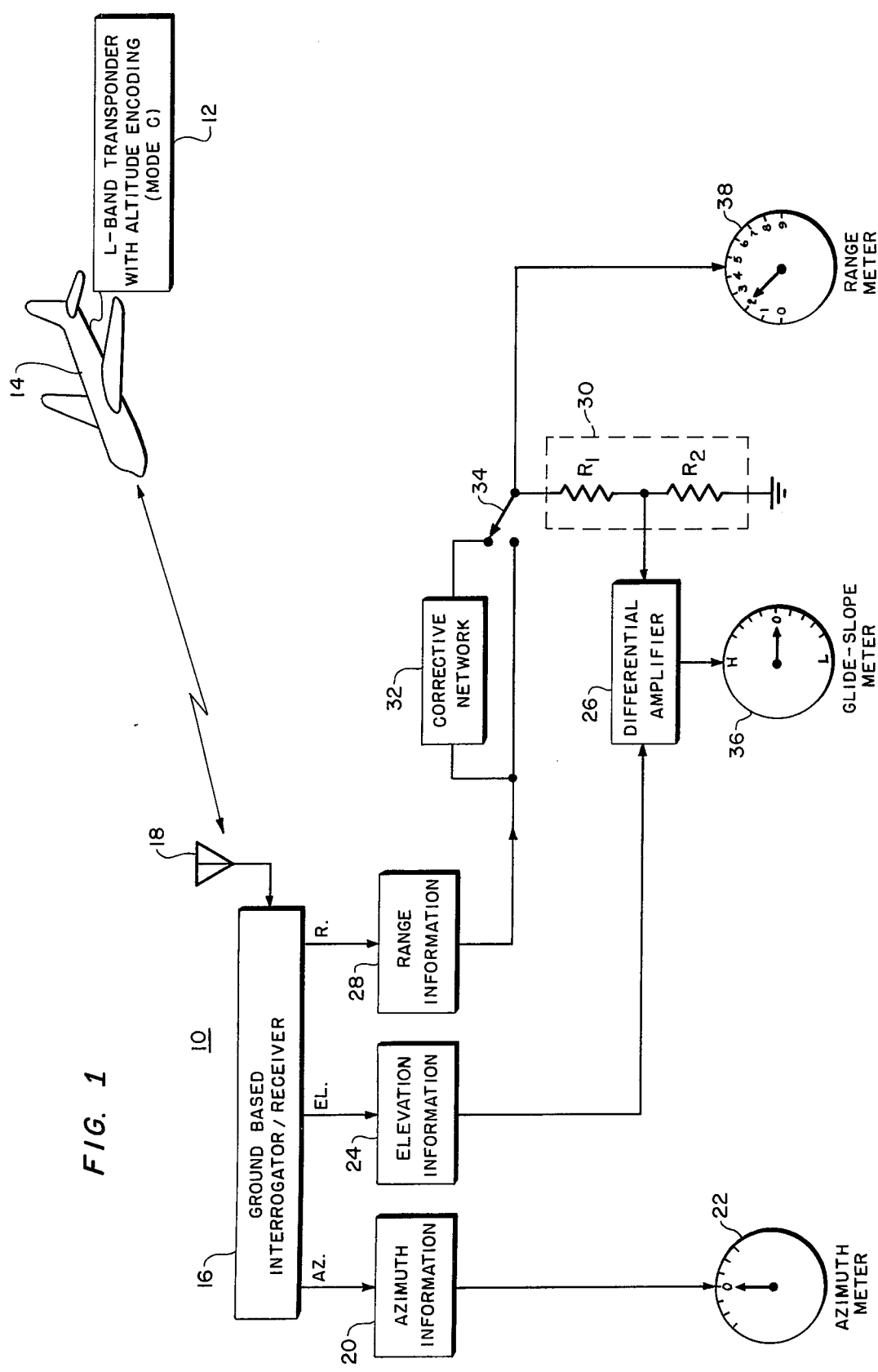
FIG. 1 is a block diagram of the landing approach system utilizing a ground based interrogator/receiver.

Referring now to FIG. 1 of the drawing, the ground based control equipment is shown at 10 and the associated L-band transponder with automatic altitude encoding equipment, (Mode C), is shown at 12 aboard aircraft 14. Ground based equipment 10 includes an interrogator/receiver 16, preferably a Lightweight Interrogator Transponder System (LITS), hereinafter referred to as the ground unit, which is adapted to interrogate or trigger the L-band transponder 12 on aircraft 14. The altitude encoding system included in aircraft transponder 12 automatically transmits encoded altitude, or elevation information to ground unit 16 when aircraft transponder 12 is interrogated. The automatic altitude information operation is designated in the art as Mode C and is an essential component of the present invention. Antenna 18 of ground unit 16 is arranged so that its electronic center points down the center line of the landing runway. Ground unit 16 includes circuitry for decoding the aircraft altitude information and for processing the received signal to determine relative azimuth and range of an approaching aircraft whose transponder has been triggered and a response signal is received therefrom at ground unit 16. The signals indicating relative azimuth, aircraft altitude and aircraft range are derived from azimuth information circuit 20, elevation information circuit 24, and range information circuit 28, respectively. Since such circuitry is well known in the art, no further description thereof is believed necessary. The azimuth signal output from azimuth information circuit 20 is applied to azimuth meter 22 which indicates the relative azimuth of aircraft 14. With the antenna center point a zero reference as hereinabove described, the approaching aircraft 14 will be aligned with the landing runway laterally as long as the azimuth meter 22 reading is zero. If the aircraft drifts off the runway center line extension as indicated by meter 22, the controller then alerts the pilot of approaching aircraft 14 with the correct steering information. The altitude information derived from elevation information circuit 24 is applied as one input to a difference amplifier 26. The aircraft range signal derived from range information circuit 28 is applied as a second input to difference amplifier 26 through a voltage dividing network 30 including two series connected resistors R1 and R2. As shown, the signal applied to difference meter 26 is developed across R2 which is connected to ground. Dividing network 30 modifies the range signal by a constant factor $k$ to provide a signal $kd$ where $k$ is a function of R1 and R2 and $d$ is distance of aircraft 14 from touchdown, as explained below. Range information 28 output signal may be applied to voltage dividing network 30 directly or through a corrective network 32 by means of switch 34. The circuitry of corrective network 32 is well known in the art and is switched in only under certain conditions as explained below. The output of difference amplifier 26 is applied to a meter 36 hereinafter referred to as the glide slope meter. Range information signal output is also applied to range meter 38 which provides the controller with range information at all times. Range meter 38 will display the distance, $d$, of the aircraft from touchdown.

Figure 2:
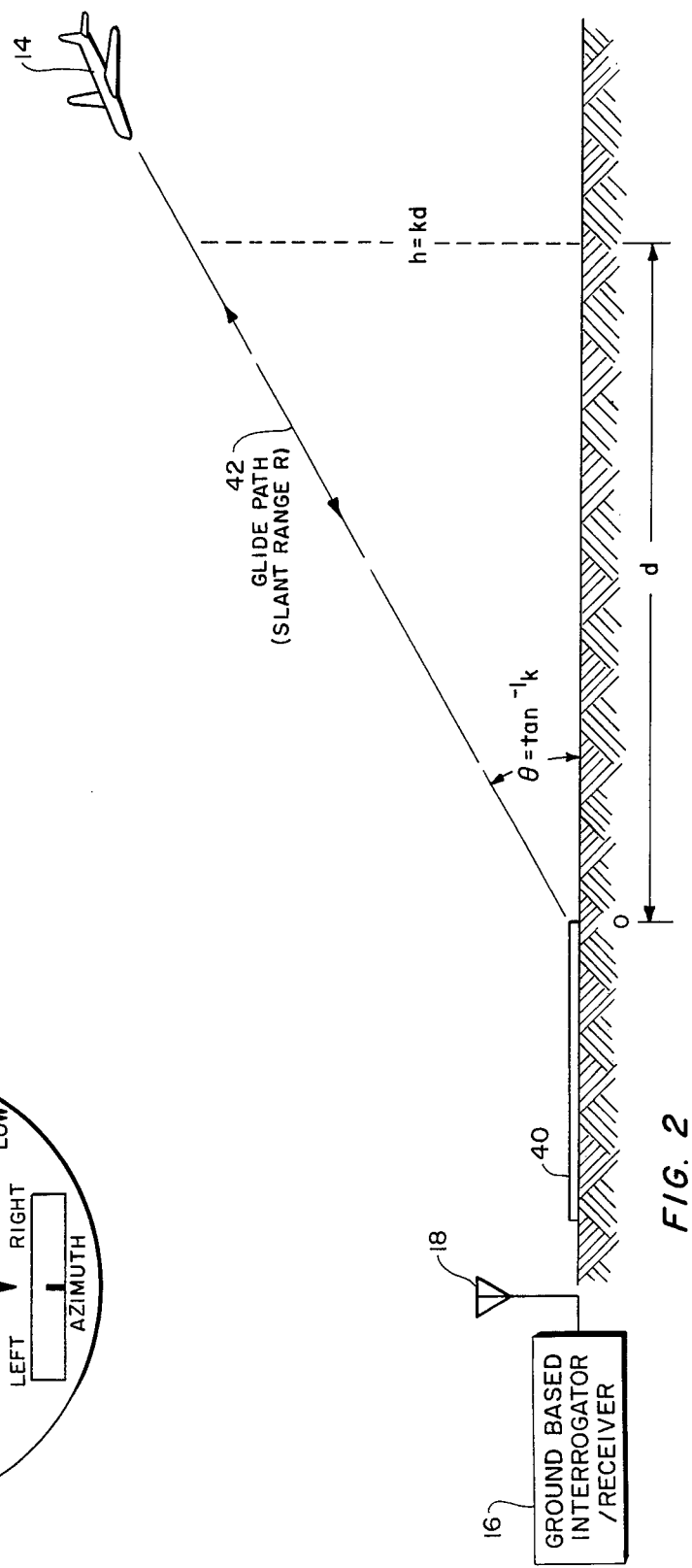
FIG. 2 is an explanatory drawing illustrating the operation of the present invention.

Referring now to FIG. 2, the runway 40, which is aligned with the electronic center of the antenna of ground interrogator/receiver 16, is shown with respect to the glide path 42 of the approaching aircraft 14. It can reasonably be assumed glide path 42, which is the vertical approach path, is a straight line, namely the height $h$ above the runway 40 (ground). As can be seen, the height $h = kd$ where $k$ is the constant which determines the glide path angle $\theta = \tan^{-1} K$ and $d$ is the actual ground distance to touchdown of approaching aircraft 14. Glide path constant $k$ is generated by selecting the values of R1 and R2 of divider network 30 such that $k = (R2/R1 + R2)$ where the second input to difference amplifier 26 is applied between $R2$ and ground. Although the signal from range information circuit 28 measures slant range R, range meter 28 can be modified to read actual ground distance of source $d = R \cos \theta$ and $\theta$ is constant for any particular glide path. Since $(d/R)$ is constant for any particular glide path, the second input to difference amplifier 26 represents $h = kd$. The actual altitude of approaching aircraft 14 derived from elevation information circuit 14 is compared with the value $h = kd$ in difference amplifier 26 and the output therefrom is shown on glide slope meter 36. The reading on glide slope meter 36 will indicate whether aircraft 14 is on the proper glide path, above or below it. This information can be communicated by radio to the pilot of aircraft 14. The approach angle $\theta$ and the corresponding glide path can easily be altered, as required, by simple controls well known in the art. Corrective network 32 is utilized to compensate for a very steep approach angle $\theta$. The necessity for such a corrective network can be seen in connection with FIG. 2. From FIG. 2 it can be seen that $R = d\sqrt{1 + k^2}$ and accordingly $d = (R\sqrt{1+k^2})$. If the term $\sqrt{1 + k^2}$ should become sufficiently larger than 1.0 because of a very steep approach angle, corrective network 32 is required in the range output line to compensate for this error. The value of $\sqrt{1 + k^2}$ and the correction $(1\sqrt{1+k^2}) < 1$ is constant. The corrective network 32 may be switched into range information 38 output circuit by means of switch 34 whenever necessary.

While the system described above assumes the runway elevation is zero, normally this is not the case. However, this condition may be taken into account by utilizing a barometric sensor on the landing field whose electronic output is differentially connected to the elevation readout signal derived from elevation information circuit 24. The elevation readout signal is of course the elevation reported by aircraft 14 by means of the aforementioned mode C operation included in the aircraft 14 transponder. In operation, the land controller will convey the corrective information to the pilot of the approaching aircraft by means of the radio communication network aboard the aircraft. By observing the azimuth meter 22, the glide scope meter 36 and the range meter 38, the controller will be able to inform the pilot of the approaching aircraft position relative to runway center line and glide path, and distance from touchdown.

Due to the inherent altitude reporting granularity of $\pm 100'$ and altimeter tolerances of $\pm 30'$, it is realized that the above described system would not have the accuracy of the present radar based GCA systems and a somewhat higher minimum descent altitude (MDA) will be required. However because the MDA will be slightly higher, the runway alignment accuracy requirements are decreased, thereby making the installation far less critical. Therefore, the advantage of the present invention is that it becomes feasible to provide a GCA type facility at almost any air strip, and that the equipment is readily moveable since it is small, light, and the physical placement and alignment is not very critical.

Figure 3:
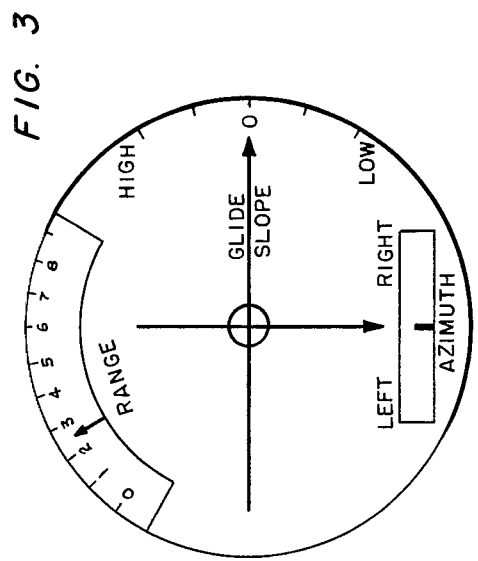
FIG. 3 shows a preferred arrangement of meters utilized in the present invention.

FIG. 3 shows a single meter display system which can replace the three meters shown in FIG. 1. By using a single meter as shown in FIG. 3, the controller can monitor the aircraft approach without simultaneously scanning the three meters shown in FIG. 1. It is to be realized of course that the distance or range indicator could be in a digital format. It is to be further realized that rather than having the controller talk the pilot down, the system could be mechanized to send code, tones or synthesized voice over radio which would give the pilot a continuous audio or visual monitor system of his approach without adding further equipment to the aircraft.

What is claimed is:

1. A landing approach system for aircraft having a transponder which includes means for automatically transmitting encoded altimeter information when said aircraft transponder is interrogated, said system comprising:

a ground based interrogator/receiver unit for interrogating said aircraft transponder and adapted to receive response signals therefrom including said encoded altimeter information, the electronic center of said land based transponder antenna being aligned with the center line of a prescribed landing runway;

means in circuit with said ground based unit for processing said response signal for respectively determining the azimuth of said aircraft relative to said runway, and the range of said aircraft to the point of touchdown on said runway;

means in circuit with said ground based unit for decoding said encoded altimeter information to produce signals corresponding to the elevation reported from said aircraft;

means responsive to the output of said range determining means for generating signals corresponding to a ground distance and a vertical approach path for said aircraft whereby a glide path for said aircraft is prescribed, said vertical approach path signals being a fixed proportion of said ground distance signals; and means for comparing said vertical approach path signals with said aircraft elevation reported signals to produce error signals corresponding to the difference therebetween;

said azimuth, range and error signals comprising the information for guiding said aircraft along said glide path.

2. The landing approach system in accordance with claim 1 wherein said last mentioned means comprises a difference amplifier.

3. The landing approach system in accordance with claim 1 wherein said vertical approach path signals are developed across a voltage dividing network having two series connected resistors, said fixed proportion of said ground distance signals being in the ratio of one of said resistors divided by the sum of said two resistors.

4. The landing approach system in accordance with claim 3 wherein said resistors are R1 and R2, and said vertical approach path signals equal $kd$ where $d$ is the distance of said aircraft from touchdown point and $k = (r2/R1+R2)$.

5. The landing approach system in accordance with claim 2 wherein one input to said difference amplifier is said decoded altimeter signals and a second input to said difference amplifier is said vertical approach signals.

6. The landing approach system in accordance with claim 2 wherein said vertical approach path signals are developed across a voltage dividing network having two series-connected resistors R1 and R2.

7. The landing approach system in accordance with claim 6 wherein said vertical approach path signals equal $kd$ where $d$ is the distance of said aircraft from touchdown point and $k = (R1/R1+R2$.

8. The landing approach system in accordance with claim 5 wherein said vertical approach path signals are developed across a voltage dividing network having two series-connected resistors R1 and R2.

9. The landing approach system in accordance with claim 8 wherein said vertical approach path signals equal $kd$ where $d$ is the distance of said aircraft from touchdown point and $k = (R1/R1+R2$.

10. The landing approach system in accordance with claim 4 wherein the glide path angle relative to said landing runway is $\theta = \tan^{-1} K$.

* * * * *